United States Patent

Blüthgen

[11] Patent Number: 5,150,113
[45] Date of Patent: Sep. 22, 1992

[54] METHOD AND APPARATUS FOR TRANSMITTING AN INFORMATION SIGNAL TOGETHER WITH DATA PACKETS OF RELATED AND UNRELATED TEXTUAL INFORMATION AND RECEIVING APPARATUS THEREFOR

[75] Inventor: Björn Blüthgen, Celle, Fed. Rep. of Germany

[73] Assignee: Philips and Du Pont Optical Company, Nieuwegein, Netherlands

[21] Appl. No.: 499,914

[22] Filed: Mar. 26, 1990

[30] Foreign Application Priority Data

Mar. 28, 1989 [EP] European Pat. Off. ........ 89200779.0

[51] Int. Cl.⁵ .............................................. H04B 1/00
[52] U.S. Cl. .................................. 340/825.3; 358/342
[58] Field of Search ..................... 380/21, 22, 23; 340/825.3, 825.5, 825.52; 358/86, 102, 141, 142, 342; 235/375, 376

[56] References Cited

U.S. PATENT DOCUMENTS 4,707,818 11/1987 Suzuki et al. ................. 358/342
4,744,080 5/1988 Brennard et al. ............... 380/21
4,843,484 6/1989 Kanamaru et al. ............. 358/342
4,893,193 1/1990 Nakamura et al. ............. 358/342

Primary Examiner—Donald J. Yusko
Assistant Examiner—Dervis Magistre
Attorney, Agent, or Firm—Leroy Eason

[57] ABSTRACT

An information signal representing audio and/or video information is read together with a series of first data packets representing textual subinformation relating thereto from a record carrier on which such signal and data packets have been recorded together. A series of second subinformation data packets having the same format as the first subinformation packets are interleaved therewith so as to form a subinformation signal, such signal being combined with the main information signal to form a transmission signal for transmission to a receiver, the second subinformation packets representing textual subinformation unrelated to the main information signal. A receiver for such transmitted signal reproduces the information in the main information signal together with selected portions of the textual subinformation represented by the data packets, such selection being effected by a user in accordance with menus represented by the data packets and displayed on a video display unit of the receiver.

14 Claims, 16 Drawing Sheets

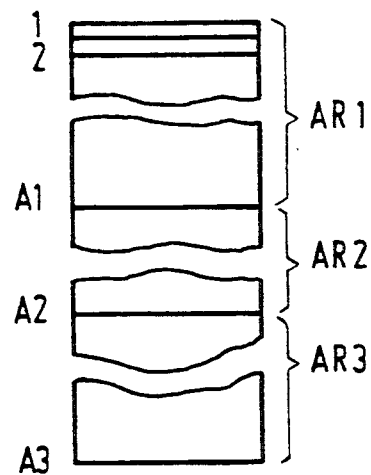
FIG. 12
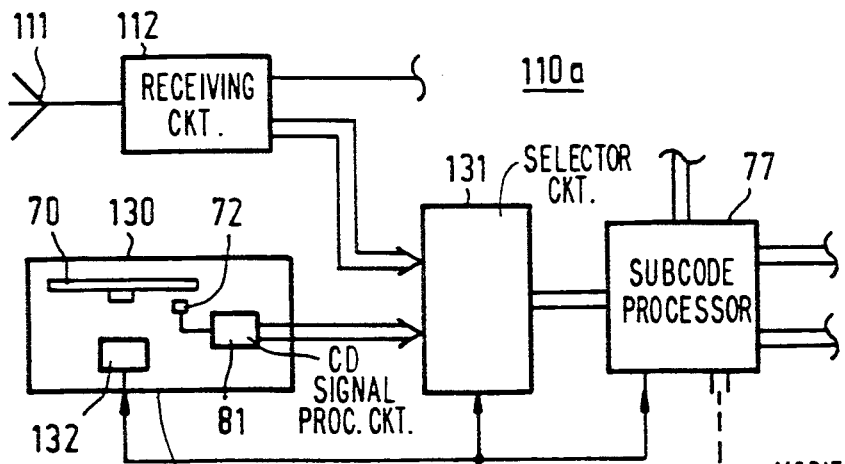
FIG. 13  MODIFICATION OF RECEIVER IN FIG.11
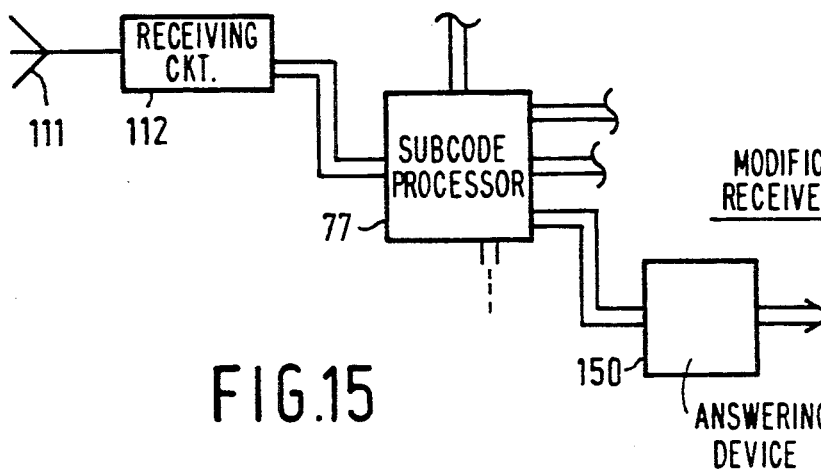
FIG. 15  MODIFICATION OF RECEIVER IN FIG.11

METHOD AND APPARATUS FOR TRANSMITTING AN INFORMATION SIGNAL TOGETHER WITH DATA PACKETS OF RELATED AND UNRELATED TEXTUAL INFORMATION AND RECEIVING APPARATUS THEREFOR

BACKGROUND OF THE INVENTION

The present invention relates to a method for transmitting a transmission signal indicative of a main information signal and a subinformation signal, in which method the main information signal is read from a record carrier. The invention further relates to a transmitting device and receiving device accordance with in the method.

Systems of the type described herein are known for broadcasting systems, in which the main information consists of a audio and/or video program and the subinformation comprises information about e.g. news, weather and traffic-information.

After the transmission signal has been received the subinformation signal can be separated and displayed. It is an object of the present invention is to provide a system which expands the service provided to the users receiving the transmission signal.

SUMMARY OF THE INVENTION

According to the invention, this is achieved by a system the described type characterized in that the record carrier used is of a type on which the main information signal has been recorded together with first subinformation packets having a predetermined data format and representing subinformation related to the main information signal. Second subinformation packets having the same format as the first information packets and representing information not related to the main information signal are produced and interleaved with the first subinformation packets so as to complete the composing of the subinformation signal.

In this system subinformation related to the main information can be transferred in very simple way. This system is particularly advantageous for Digital Audio Broadcasting systems in which digital audio read from e.g. a compact disc is to be transmitted, because the subinformation recorded on the record carrier together with the audio program can be simply mixed with the other subinformation which is not directly related to such program. The use of the same format for the two different types of subinformation packets has the additional advantage that in the event a receiving device comprises also a player for the record carriers, the same decoder can be used for the processing of subinformation packets received from the broadcast station and the subinformation packets read by the player.

In accordance with the method is, the first and second subinformation packets represent information in first and second groups of menus respectively, each menu comprising items representing commands and corresponding command codes for executing the commands. The use of menus allows a simple manner of selection of the subinformation to be separeted. A further simple embodiment of the method is characterized in that menu information comprises address information indicating the location in a memory at which the menu information is to be stored after it has been received. A further embodiment of the method according to the invention is characterized in that the address information of the main menu of the first group of menus indicate a predetermined memory address, the main menu of the second group of menus comprising a combination of a menu item and a command code referring to the first main menu and its predetermined memory address. This embodiment has the advantage that it is always possible to jump from the group of second menus to the group of first menus.

Another variation of the method is characterized by second subinformation packets of coded messages comprising password codes. This method allows paging via the broadcast system, in which messages can be sent to individual users indicated by the password code. A further simple embodiment of the method is characterized in that the coded messages comprise address information indicating the memory addresses in which the message is to be stored after it has been received.

A transmitting device in accordance with the method, comprises a reading device for reading the main information from a record carrier and converting means for converting the main information signal and the subinformation signal into a transmission signal. The reading device is adapted for reading a record carrier on which the main information has been recorded together with first subinformation packets having a predetermined data format. The converting means are adapted for interleaving such first subinformation packets with second subinformation packets having the same data format as the first subinformation packets, so as to produce the subinformation signal. An illustrative embodiment of the transmitting device is characterized in that the converter provides address codes indicating addresses in a predetermined address range of memory outside an address range used for storing menu information. This arrangement allows the use of the same storing means in a receiver for storing the menu information and the coded messages in a common memory.

In a receiving device in accordance with the method, the receiving device separates the subinformation signal and main information signal, reproduces the information represented by the main information signal, and displays a selected part of the information represented by the subinformation signal, and is characterized by storing in a memory menu information comprised by subinformation packets, the displaying portion being adapted to display the items of a menu stored in the selected part of the memory. The receiving device provides for selecting the menu item of the displayed menu and executes the command indicated by the command code stored in the memory and which corresponds with a selected menu item. This illustrative embodiment allows a simple and user-friendly setting of the receiving device, e.g. the setting of selection means for selecting the subinformation packets.

A receiving device in accordance with the method receives the transmission signal, separates the main information signal and selected parts of the subinformation signal, and reproduces the information represented by the main information signal. In one embodiment it is characterized by selecting coded messages indicated by a determined password code by comparing received password codes with a user defined password code, and input means for entering the user defined password code to the selection means. A further illustrative embodiment of the receiving device is characterized in that it includes an answering device for transmitting a reply signal and means for activating the answering device in response to the detection of a predetermined pass word code. This embodiment allows to directly transmit an answer in response to predetermined messages received.

BRIEF DESCRIPTION OF THE DRAWINGS

The invention will now be described in more detail, by way of example, with reference to the accompanying drawings, in which FIGS. 11, 13 and 15 show illustrative embodiments of the receiving device in accordance with the invention, FIG. 12 show schematic different address ranges for use in the memory of the receiving device.

DETAILED DESCRIPTION OF THE PREFERRED EMBODIMENTS

Before describing the transmitting method according to the invention in detail first of all an embodiment of a system for recording subinformation and menu information on a record carrier will be described.

Figure 1:
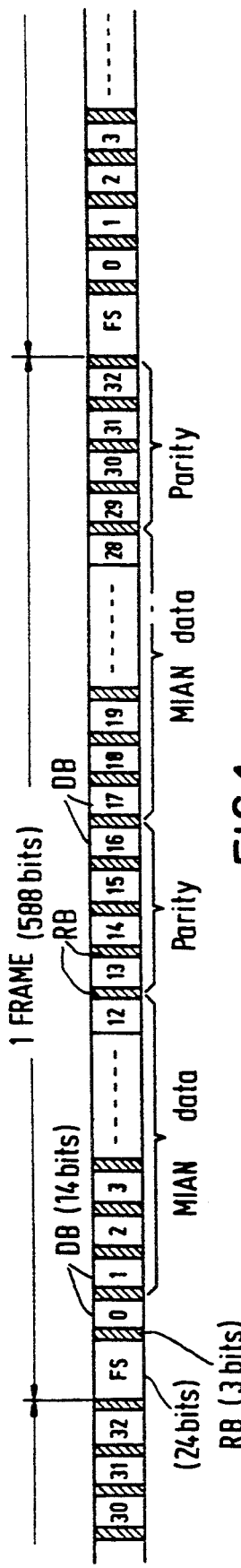
FIGS. 1 and 2 show the data structure of a standardized CD-signal.

FIG. 1 shows the digital data stream recorded on a compact disc or in the audio channel of a CDV-disc. One FRAME consists of 588 bits of record data, and each FRAME has at its head a frame sync pulse FS of a specific bit pattern. The frame sync pulse FS is followed by three DC-restriction bits RB. Thereafter, the 0th-32nd data words DBs, each having fourteen bits and 3-bit DC-restriction bits RB are further recorded successively. The 0th of these data words DBs of successive frames are called the subcode signal, and are used to control the playback of a disc and to display related textual information or the like. The 1st-12th and 17th-28th data words DBs are assigned for audio data in the main channel. The remaining 13th-16th and 29th-32nd data words DBs are assigned for parity data of the error correction code in the main information channel. Each of the data words DBs consists of 14 bits into which an 8-bit data word has been converted by the 8-14 conversion upon recording.

Figure 2:
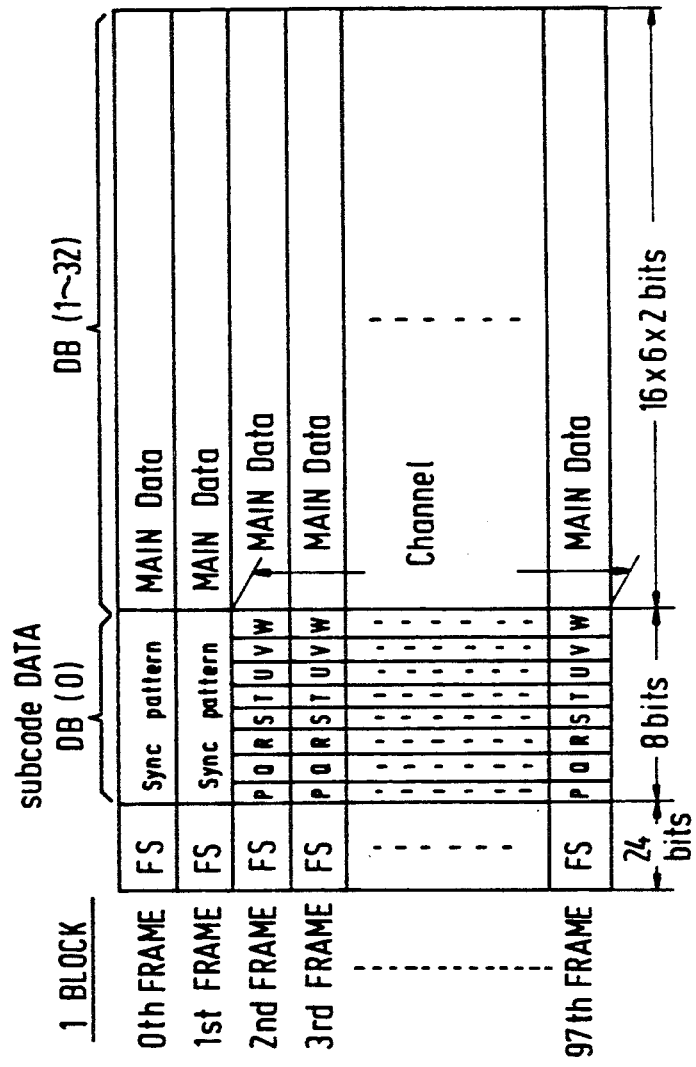

FIG. 2 shows the state of one BLOCK (98 FRAMEs) in which 98 FRAMEs are arranged sequentially in parallel, wherein each of the data words DBs is represented by 8 bits and the DC-restriction bits are excluded. The subcode signals P-W in the 0th and 1st FRAMEs form the sync patterns, which are predetermined bit patterns. For the Q-channel, the CRC-codes for error detection are inserted in the latter 16-FRAMEs among the 98 FRAMES.

The P-channel signal is a flag to indicate a music program and a pause, and has a lower level throughout the duration of a music program and a higher level throughout the duration of a pause, and has pulses of 2-Hz period in the lead-out section. It is possible to select and play back the specified music program by detecting and counting this signal in the P-channel. The Q-channel enables more complicated control of this type. For example, when the Q-channel information is stored in a microcomputer in the disc playback apparatus, it is possible to jump quickly from one music program to another during the playback of a music program; thus, respective ones of the recorded music programs may be selected at random.

The other R- to W-channels are used for example for transferring textual information. The format in which these data is transferred will be described in detail further herein.

Among the 98 bits in the Q-channel, the first two bits are used for a sync pattern; next four bits for control bits; following 72 bits for data bits; and at last a CRC-code for error detection is added. A track number code TNR and an index code X are included in the 72 bits representative of the data bits. The track number code TNR can be varied from 00 to 99, and the index code X can be likewise changed from 00 to 99. Furthermore, the data in the Q-channel contains a time indication code representative of the time durations of music programs and pauses, and a time indication code indicative of an absolute time duration that continuously changes from the beginning to the end on the most outer rim side in the program area of the compact disc. These time indication codes comprise the code indicating minute, second and FRAME each consisting of two digits. One second is divided into 75 FRAMEs. In order to access the compact disc, such as a digital data, on a shorter unit basis than a music, the time indication code with respect to the above-mentioned absolute time duration is used.

Figure 3:
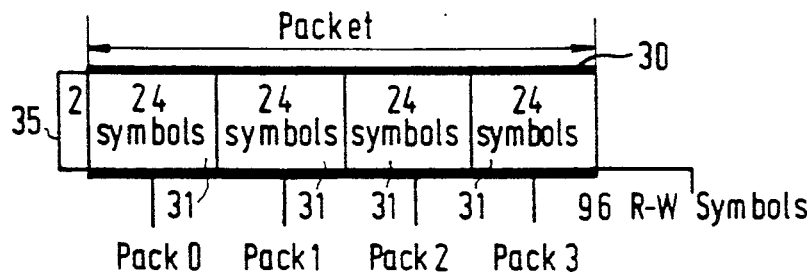
FIG. 3 shows subinformation packets formed by the R-W subcode signal bits of one block of a standard CD-signal.

The R- to W-channel bits of the FRAMES in each BLOCK constitute subinformation packet of 96 symbols of each six bits. The subinformation packets will be briefly referred to as packets. In FIG. 3 such a packet is indicated by reference number 30. The packet 30 is divided into 4 packs 31 of 24 symbols each. To each packet 30 a main category code and a sub-category code is assigned indicating the category to which the information of the packet belongs. Packets of different categories are interleaved. The information recorded in the packets may be textual or image information to be displayed on a display device or command codes for controlling the read-out of the information.

Figure 4:
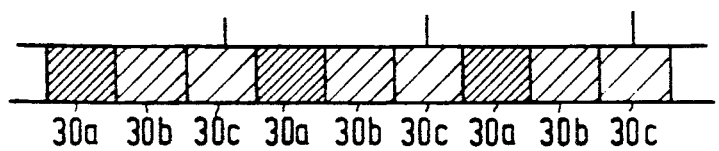
FIG. 4 shows a sequence of a number of interleaved data packets of different information categories.
Figure 5A:
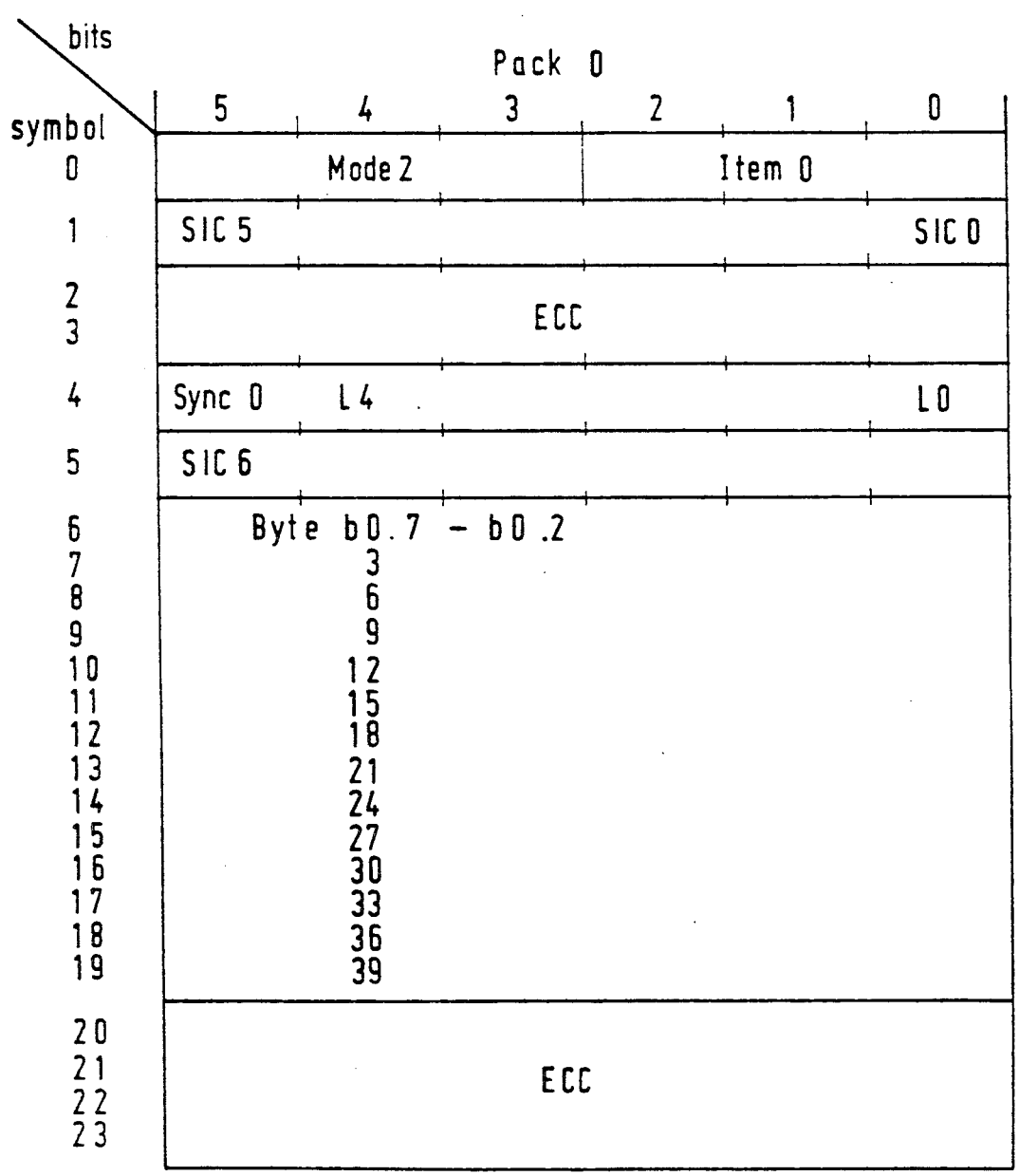
FIGS. 5a-5d and 6a-6d show an embodiment of the data format of packets for use in the system according to the invention, FIG. 7 show an illustrative embodiment of a player for playing a record carrier in which a main information signal has been recorded together with subinformation data packets relating thereto.
Figure 5B:
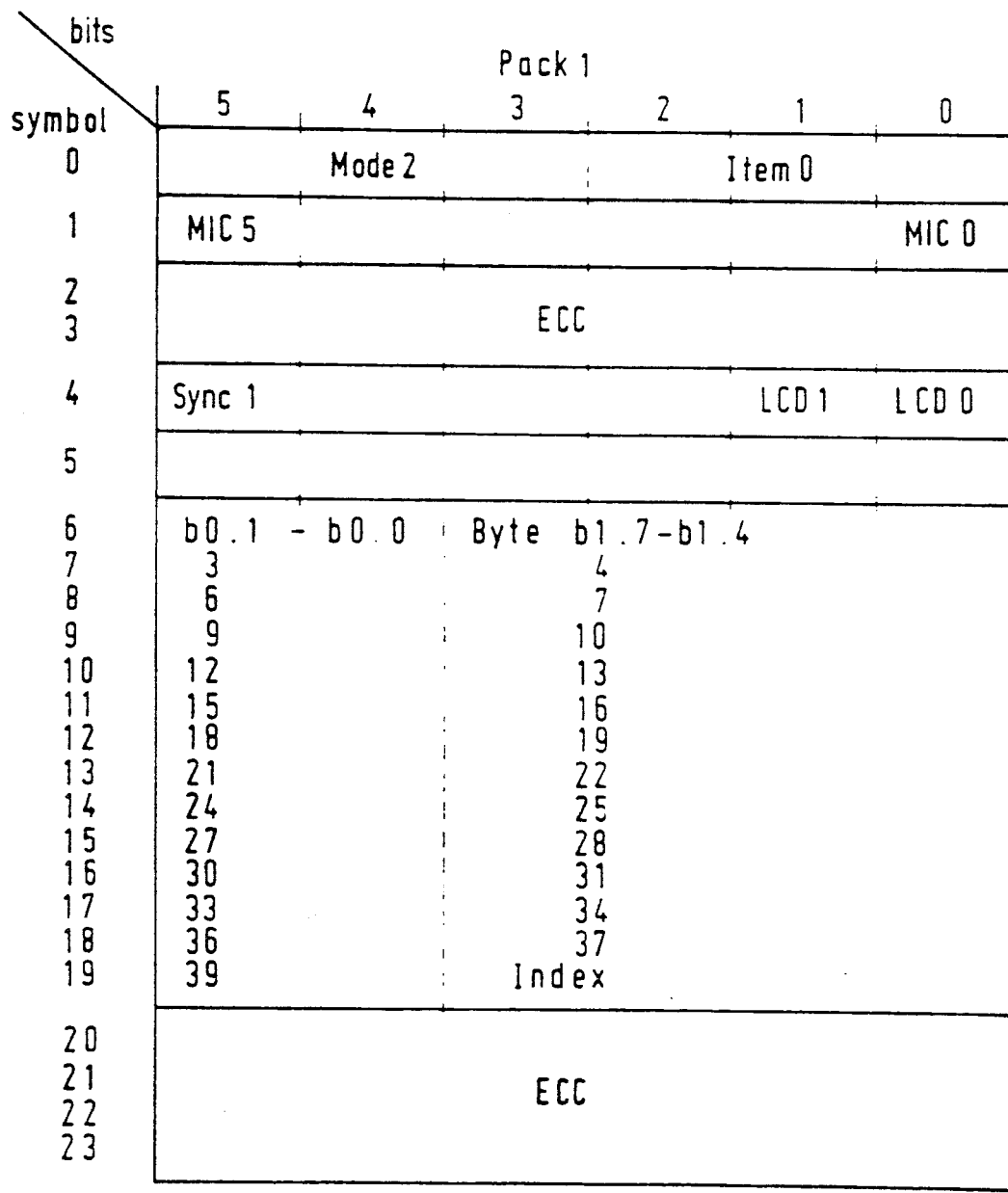
Figure 5C:
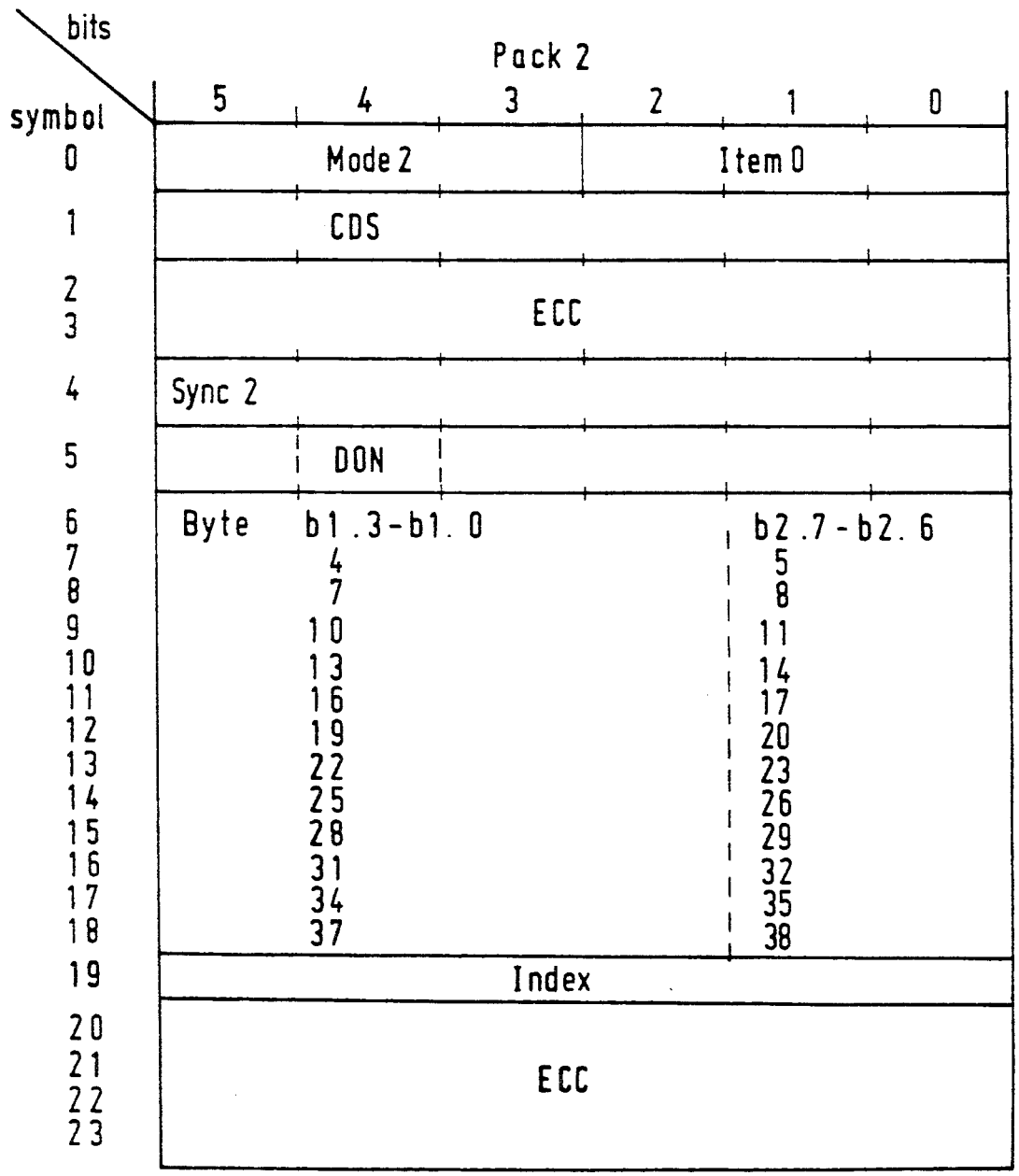
Figure 5D:
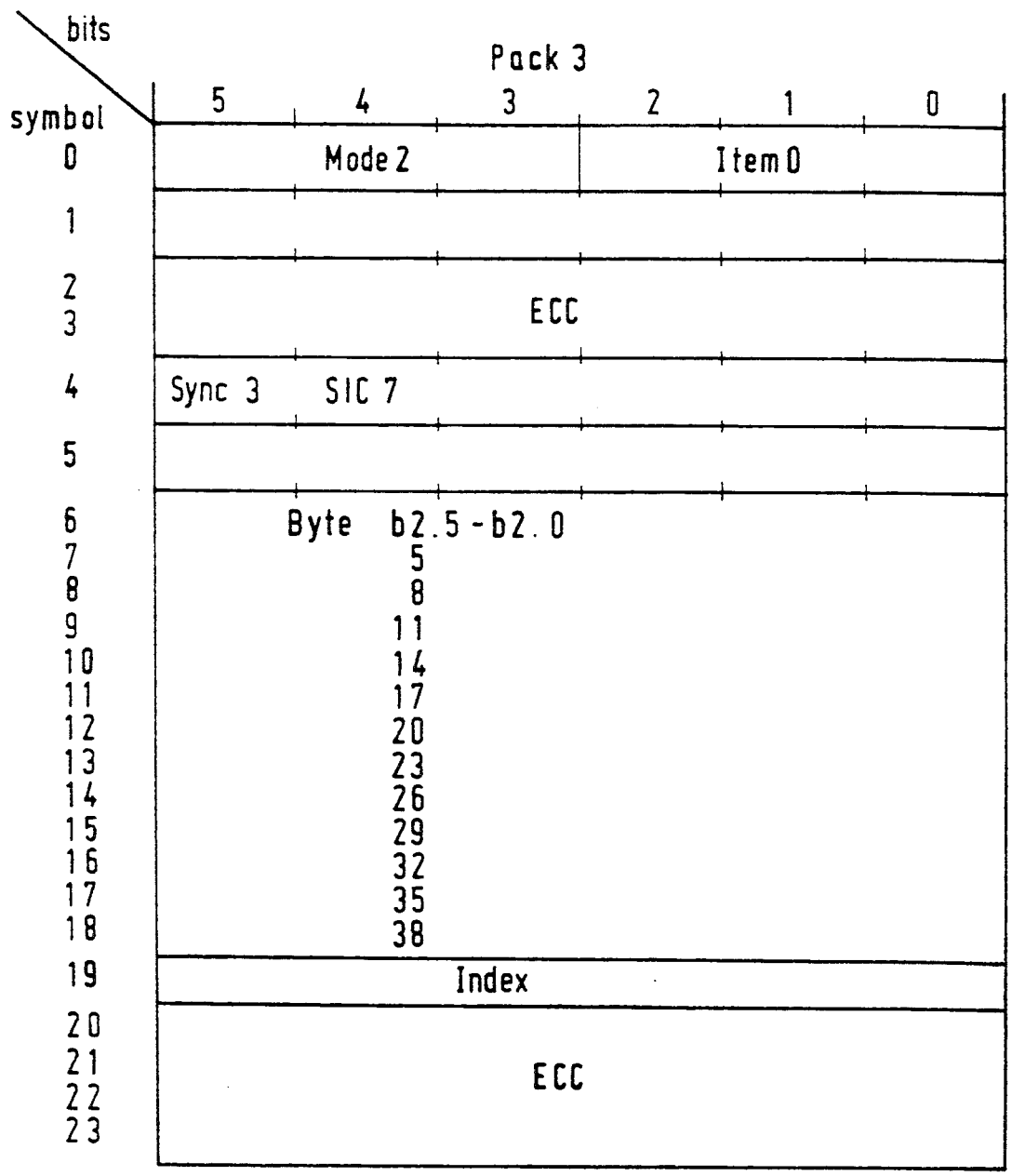

FIG. 4 shows a sequence of interleaved packets of different categories. The packets of the different categories are indicated with the reference signs 30a, 30b and 30c respectively. The packets of the same main category form a main channel. The packets of the same sub-category within a main channel form a sub-channel.

A use for a main channel could be a choice of language of the textual information to be displayed. A use of the sub-information channel could be the choice of sub-information categories such as the album, track title, track list, artist etc.

The use of channels of different categories enables the selection of the language and the sub-information category to be displayed on a display during the playing of the disc.

FIGS. 5a to 5d show formats of the packs 0, 1, 2 and 3 respectively suitable for transferring a line of coded text. Symbol 0 of each pack is used to indicate the type of the format. The format shown, indicated by mode 2 item 0, used for transferring a coded text line of 40 text items. The bits of symbol 1 and bit 5 of symbol 5 of pack 0 and bit 4 of symbol 4 of pack 3 are used to transfer the eight bits (SIC7-SICO) indicating the sub-information category. The bits (MIC5-MICO) of symbol 1 of packet 1 are used to indicate the main category. In doing so 64 different main categories and 256 different sub-information can be selected. The bit 5 of symbol 4 of each pack is used for packet synchronisation. The symbols 2, 3 and 20-33 of each pack are used for error checking and error correction. The symbols 6-19 of pack 0, symbols 6-18 and bits 5 and 4 of symbol 19, symbols 6-18 of pack 2 and symbol 6-18 of pack 3 are used to transfer 40 bytes each indicating a coded text item, e.g. an alphanumerical character. The bits 4-0 (L4-L0) of symbol 4, pack 0 constitute a first text position code indicating the vertical position on which the text line transferred is to be displayed on a display with a first displaying capacity, e.g. a CRT-display with a displaying capacity of 21 text lines. The bits LCD1 en LC0 in symbol 4 of pack 1 constitute a second text position code indicating the vertical position on which the coded text line is to be displayed on a display with a second displaying capacity, e.g. a two line LCD or LED-display. The use of two different text position codes assigned to the same text line allows the use of two different display types; in case a 21-line display and 2-line display. A 21-line display in the form of a television screen will be normally available when video information is transferred. However, in the case that no 21-line display is available the information, or parts thereof, can be displayed on the two line display. It is also possible to display different information on the two different displays, e.g. the 2-line display can be used for displaying textual information for indicating the function of so-called soft-keys, whilst the 21-line display is used for displaying the other textual information. When the two different displays are used in this way it can be indicated by the text position line codes L4-L0=00000 and LCD1, LCD0=00 that the coded text line of the packet is not to be displayed on the 21-line display or the 2-line display respectively.

The bits 3-0 of symbol 19 of pack 1, symbol 19 of pack 2 and symbol 19 of pack 3 are used for transferring a two bytes index code for indicating a storing position in a menu memory. The function of the index code will be discussed further in this application. Bit 4 of symbol 5 of pack 2 indicates whether the displaying means are to be switched ON or OFF. The other bits of the packs 0-3 are used for further data for controlling the display of the coded text, e.g. defining a colour, defining a scroll area, defining a display mode for text only, text combined with background video, etc.

Figure 6A:
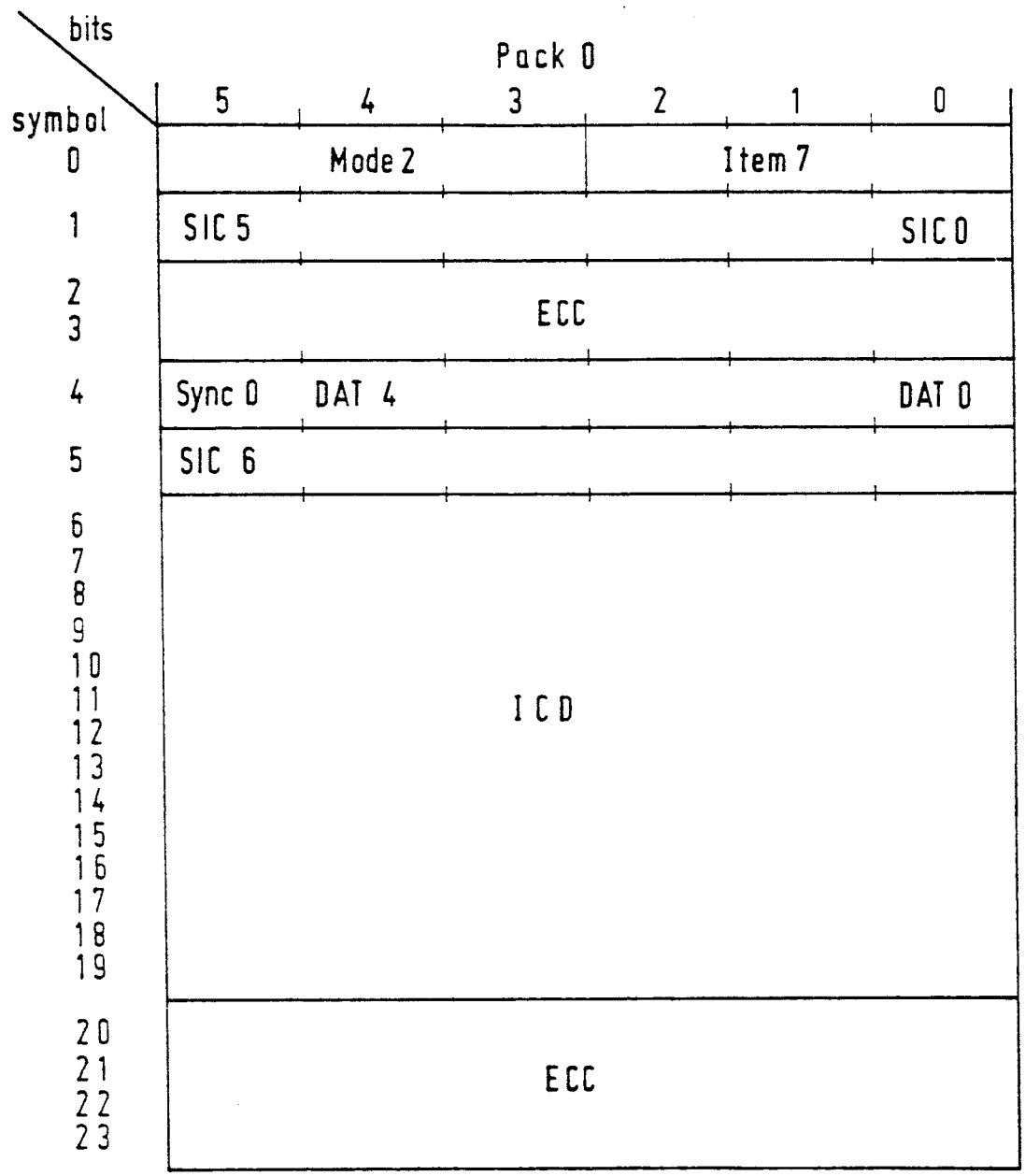
Figure 6B:
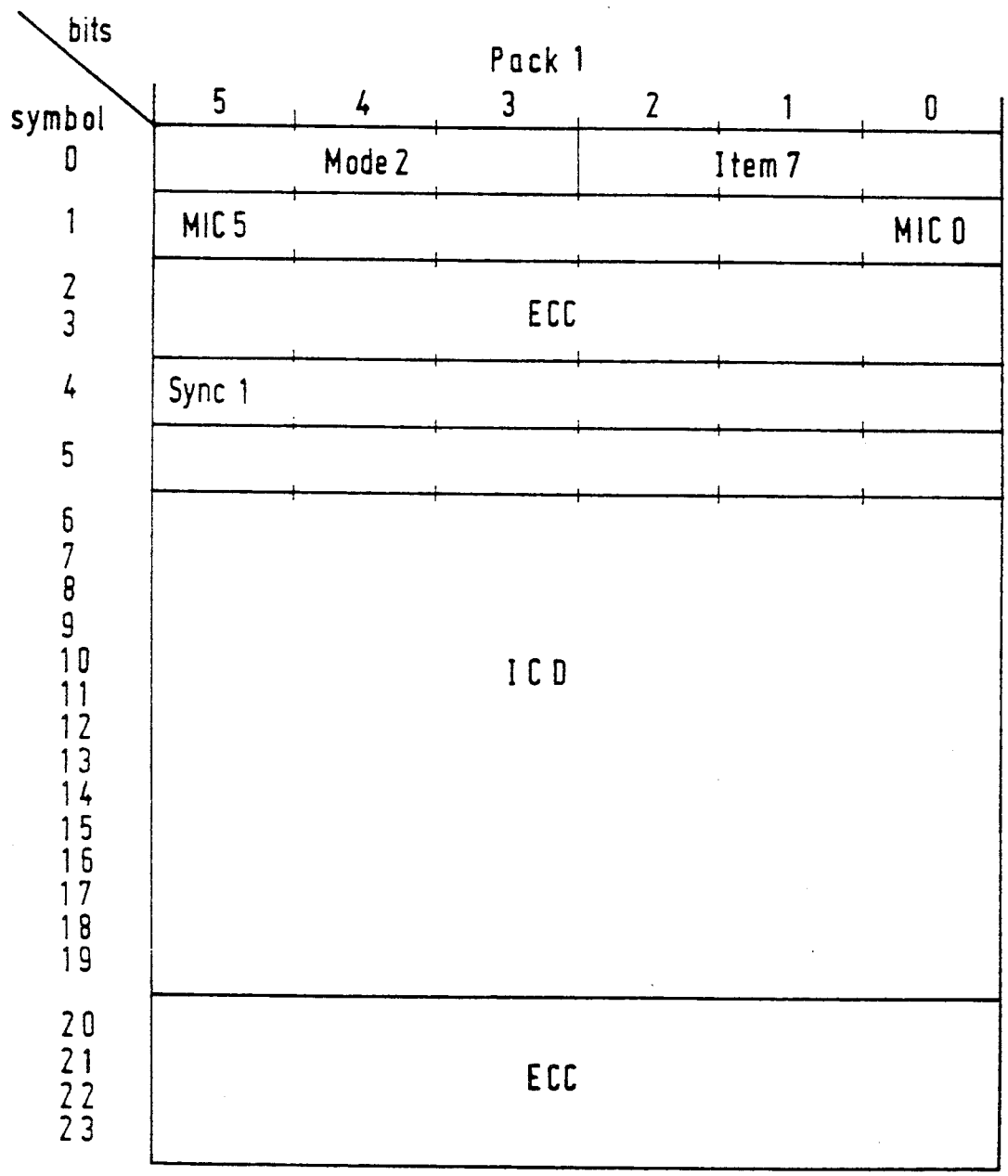
Figure 6C:
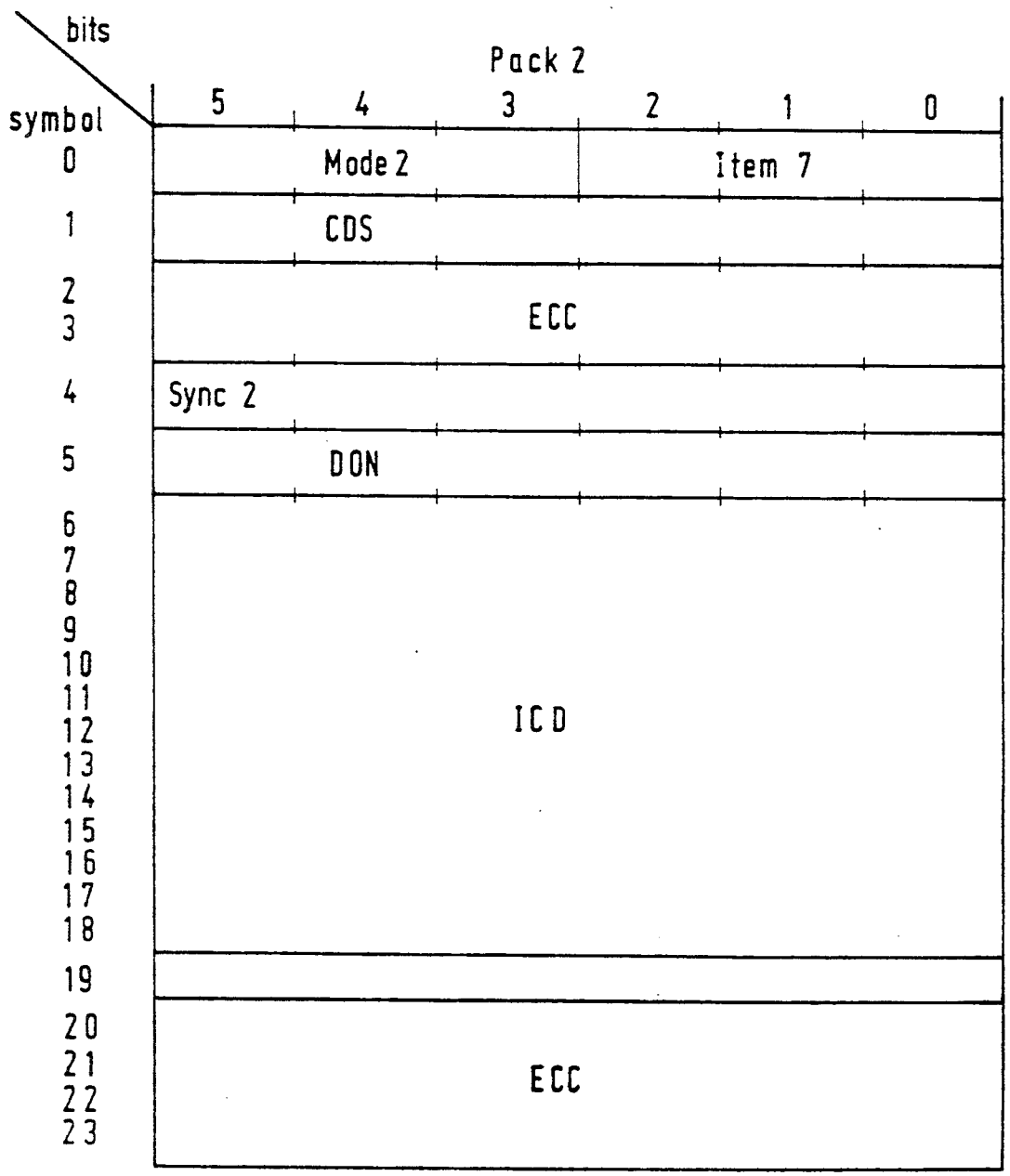
Figure 6D:
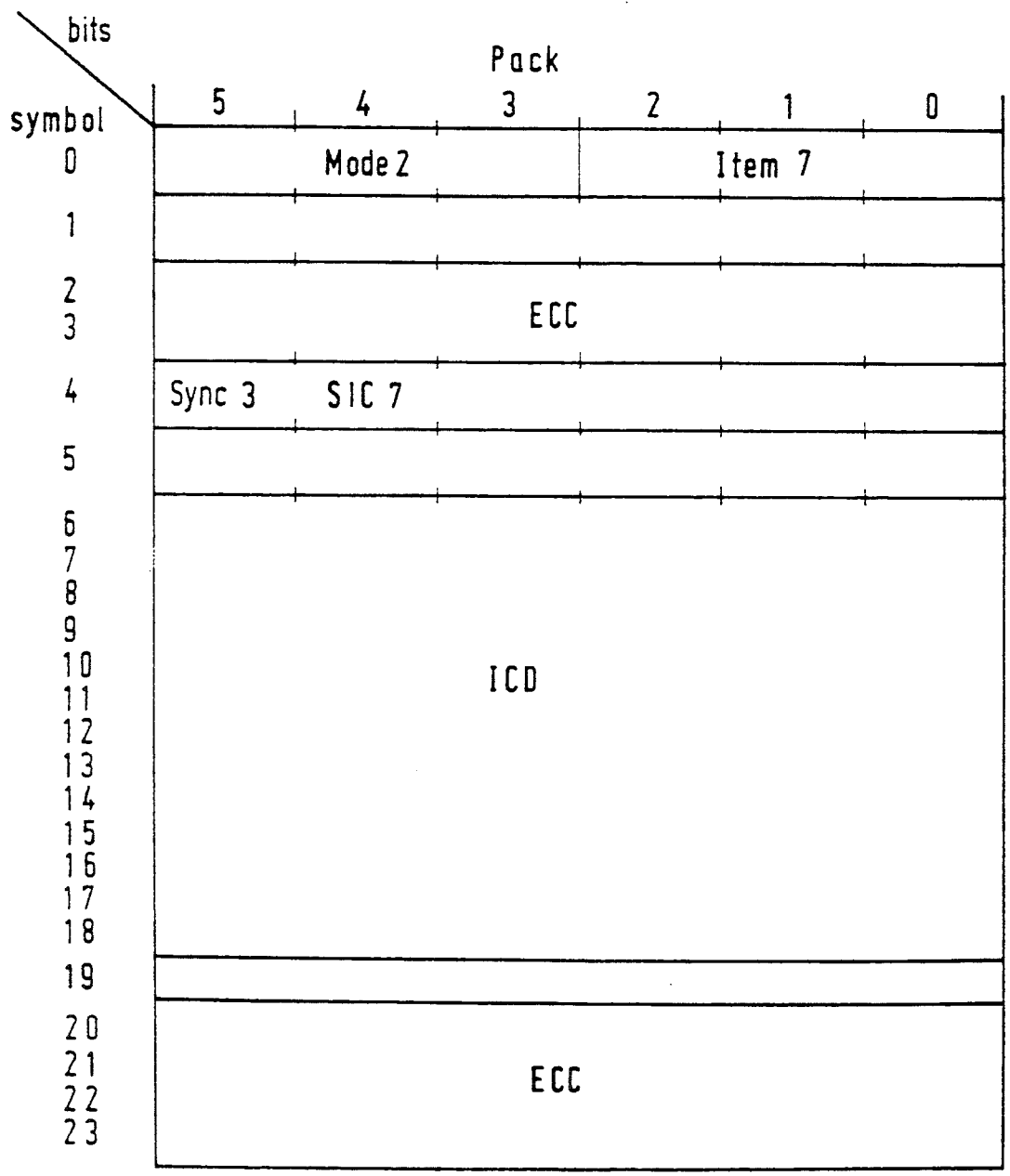

FIGS. 6a, b, c and d show an example of a format which is suitable for transferring the command codes. The bits used for the indication of the main channel and sub-channel, the error checking and correction; the synchronisation and switching on and off the displaying are the same as in the format shown in FIG. 6. The symbols 0 bits 0-2 used for item code of the pack 0-3 are used to indicate the type of format used. By means of a 4-bit code DAT4-DAT0 in bits 4-0 of symbol 4 of pack 0 it can be indicated that the packet comprises command codes. The bits used for transferring the command codes are the same as used for transferring the coded text items in the format shown in FIG. 6. For each command code a group of 7 bytes is transferred, two bytes being used for the two byte index code for indicating the storing position in the menu memory, the other five bytes are used for specifying the command.

The use of packets for transferring coded text and command codes enables interactive control of a play-back apparatus using menu information which transferred to the play-back apparatus via the packets recorded in the R-W subcode channel.

Figure 7:
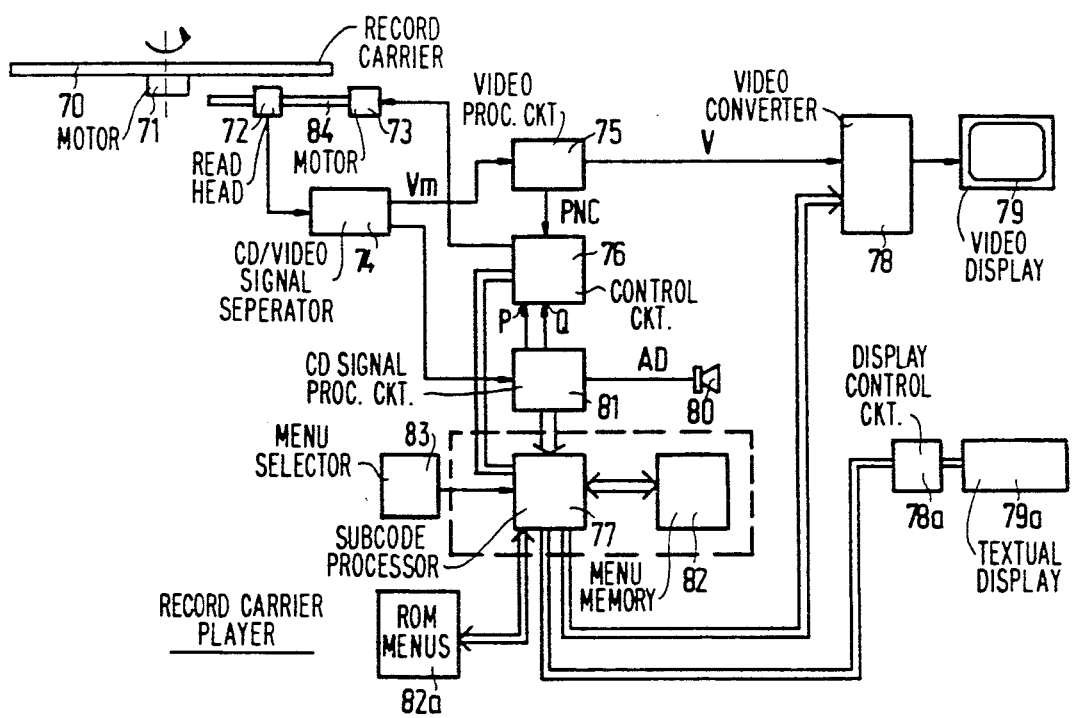

FIG. 7 shows an arrangement for retrieving the information recorded on an information carrier, which arrangement is provided with a display for displaying textual information recorded in the packets and which is further provided with means for interactively controlling the read out using menu information recorded in the packets. In FIG. 7 an information carrier is indicated by the reference number 70. On the information carrier 70 a signal is recorded which comprises a CD-signal of which the R to W sub code bits are recorded in the formats as described hereinbefore. Such information carrier may be a CDV-disc on which an FM-modulated video signal and a CD-signal has been recorded. The disc-shaped information carrier 70 is rotated by a driving motor 71. By means of a reading head 72 the information recorded is read from the disc. The reading head 72 can be moved in radial direction by a radial positioning system, e.g. a motor 73 and spindle 84, under control of a usual control circuit 76 for searching addressed information on the information carrier. The signal read is supplied to a circuit 74 which separates the CD-signal and the FM-modulated video signal.

The FM-modulated video signal Vm is supplied to a video processing circuit 75 provided with a FM-demodulator for demodulating the FM-modulated signal into a video signal V, e.g. a PAL or NTSC signal. The video processing circuit 75 further comprises means for separating picture number codes PNC transferred together with the video information. The picture number codes PNC are supplied to the control circuit 76. The CD-signal is supplied to a CD-signal processor 81 for converting the CD-signal in an audio signal AD and separating the P to W sub code signals. The sub code signals R to W are supplied to a sub code signal processing circuit, which may consists of a microcomputer 77 of a known type. The microcomputer 77 is loaded with a program for detecting whether the packets received have the format as described in FIGS. 6 and 7, using the symbols O of the packs. Further the main and sub-category codes in the packets are read and compared with codes representing the selected main and sub-category codes. The packets of which the detected category code corresponds with the selected categories are separated and validated. The coded text items and the display control signals of the separated packets are supplied to a converter circuit 78 of usual type for converting the coded text items into video signals for displaying text line on a line position of the image on the screen of a video display 79, as indicated by the text position codes comprised by the control signals. The video signal generated by the video processing circuit 75 is also supplied to the converting circuit 78.

Dependent on the control signals received from the microcomputer 77, the converting circuit 78 will cause
 a combined display of the video information represented by the video signal and the text represented by the coded text items received, a display of only the video information,
a display of only the textual information.

As described before, packets of different main information categories may preferably be used for transferring text information of different languages. The packets of different sub information categories may be used for different types of information, e.g. sub menus, album, track and index title, track title list or the text of lyrics. In doing so the user can choose the type of text information to be displayed and the language in which the text information is to be displayed.

Preferably one main category code is reserved for indicating an override main category and one sub-category code is reserved for indicating an override sub-category. The information in packets with the override main category code and the override sub-category code are always supplied to the converting circuit 78 by the microcomputer 77 by means of bypassing the current selection of the main and sub category. The information in the packets with the override main category code and a sub-category code, not being the override sub-category code, is only supplied to the converting circuit 78 if the sub-category code corresponds with the selected sub information category.

The information in the packets with a main category code, not being the override main category, and the override sub-category is only supplied to the converting circuit 78, if the main category code corresponds with the selected main information category. The use of the override information categories is advantageous in the case that language independent text information is to be displayed, in that case is suffices to record the language independent information only in the override main channel. The use of the override categories is also advantageous in the case that important messages are to be displayed.

In the case that a number of text lines is to be displayed as an integral group of information it is advantageous to use a predetermined bit in the packet indicating the first packet of the group. In the format shown in FIGS. 6 and 7 this is the bit CDS (bit 4 in symbol 1 of packet 2). After changing of a category the start of supplying the information of the packets of the newly selected category is postponed until the CDS bit indicating the beginning of groups of packets is detected. This allows that a group of text lines is always present in sequence with a start from a defined screen position onwards, e.g. top to bottom.

The microcomputer 77 is coupled with a menu memory 82, in which the codes for text lines forming a menu item for interactive control are stored. To each menu text line a command code has to be assigned which is also stored in the menu memory. The microcomputer 77 is loaded with a program for supplying the coded menu text lines to the converter circuit 78, so as to cause a display of the menu on the displaying means 79. Further the microcomputer 77 is coupled with menu selection means 83, for selecting a menu text line displayed. This menu selection means may comprise cursor control keys for moving a cursor displayed on the screen of the displaying means, and a selection key for selecting the menu text line indicated by the cursor. When the user selects the menu text line indicated the corresponding command code is executed.

Table 1 shows an example how the menu information may be stored in the menu memory 82.

TABLE 1

| Index Address (Hex) | Packet data 4 Packs of 24 Symbols | Command |
|---|---|---|
| 0001 menu 1 (main menu) | text line 2 | go to menu at 0002 |
| 0002 | text line 4 | set main channel 2 |
| 0003 | text line 6 | set main channel 7 & sub-channel 4 |
| 0004 | text line 10 | set display on |
| 0005 | text line 12 | set display off |
| 0006 | text line 16 | go to menu at 0080 cursor at row 2 |
| * | * | * |
| menu 2 (submenu) | | |
| 0080 | text line 1 | set main channel 1, subchannel 3 |
| 0081 | text line 2 | set main channel 2, subchannel 3 |
| 0082 | text line 3 | set main channel 3, subchannel 3 |
| 0083 | text line 10 | go to menu at 0002 |
| * | * | * |

The first column at the left indicates the index address of the memory location in which a combination of menu text line and command code are stored. The function to be performed when the corresponding command code (not show) is executed is indicated in the third column. The memory location indicated by the address 01 comprises a jump command for causing a jump to the first (main) menu. The aim of this use of the index address 01 will be explained later.

In table 1 the menu information for three different menus are stored; a menu on index addresses 001-006, a menu at index addresses 080-83 and a menu at index addresses 0123-0125.

Three different types of commands are to be distinguished in table 1 in case:

A first type for causing a display of an other menu indicated by the index address comprised by the command codes. This type of command codes is stored e.g. in the memory locations indicated by index addresses 0006 and 0083.

A second type for selecting a main and/or sub-category of the packets to be separated from the packet stream received by the microcomputer 77. This type of command codes is stored in the memory locations e.g. indicated by the index addresses 001 and 0082.

A third type for setting the display on and off for displaying the coded text supplied by the microcomputer 77 to the converter circuit 78. This type of command is stored in the memory locations indicated by e.g. the index addresses 004 and 0125. The microcomputer 77 is also loaded with a program for setting on the display in response to the pressing a predetermined key. In doing so the pressing of the said key is detected by the microcomputer and the display is set ON by sending a display SET ON command to the converter circuit 78.

In the example shown in table 1 only three different types of command codes are shown. However, it will be clear for the man skilled in the art that also other types of commands for controlling any type devices by interactive read-out of the information may be used a search command for causing a search for a predetermine track, pausecommand codes for causing a pause in the playback, a mute command for causing the muting the video and or audio output, or a play command for causing a start of the read out of the information.

The menu information is stored in the R-W subcode channel in formats as shown in FIGS. 5 and 6 and preferably information is also made visible before starting the playback of the program on the information carrier 70. When the information carrier is a CD or CDV-disc the menu information may preferably be recorded before the beginning of the first information track; in the R-W channel of the track prepause (track 01 under 00) between the end of the lead in track and the beginning of the first information track. A menu being stored before the first information track, it can be retrieved and loaded in the memory before starting the playback by using the said Jump Command being executed directly after reading the TOC from the CD-subcode lead-in area. For loading the menu information into the menu memory the microcomputer 77 is programmed for detecting the index codes in the packets of the selected main category and storing the coded menu text lines and the corresponding command codes in the addresses indicated by the index code.

Coded text lines and command codes with a predetermined index code, e.g. 00, are not stored in the memory. The command codes with this index codes are directly executed. This allows the executions of a number of commands before the menu information is loaded in the memory, e.g. commands for setting the main and subcategory, initiate the search and reading of the locations in which the menu information is stored with subsequent display of e.g. a menu or a picture, and displaying a main menu after the read-in of the menu information.

Figure 8:
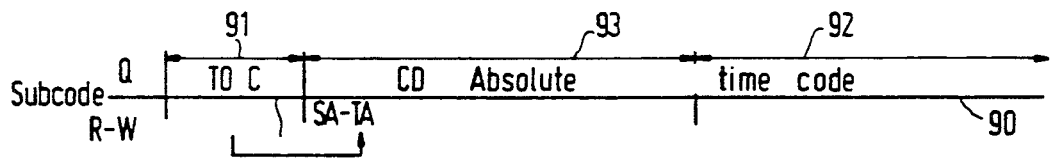
FIG. 8 shows a lay-out of an information track of the information carrier.

FIG. 8 shows the locations in which a start-up information may preferably be stored in the R-W sub code channel of a CD or CDV-disc having tracks 90 in which a CD-signal has been recorded. The beginning of the tracks has a lead-in track 91 in which a Table of Contents (TOC) has been recorded in the subcode Q-channel.

The first track with audio information (track 1/index 1) is indicated by reference sign 92. Between the lead-in track 92 and the first information track 92 a prepause track (track 1/index 0) is situated. In the part of the track 90 situated after the lead-in track an absolute time code indicating an information position (address) is recorded in the subcode Q-channel.

In the R-W subcode channel a Jump Command including an address TA indicating the beginning of the recording of the start-up information, e.g. menu information in R-W subcode channel in the prepause track 93. With the reference signs SA safety distances between the end of the Table of Contents and the beginning of the menu information are indicated. The R to W channel in the first information track (track 1/index 1) may comprise further menu information. When starting the read-out of the track 90 firstly the Table of Contents is read-in and the Jump Command code including the address TA is read from the R-W channel. After the read-in of the Table of Contents has been completed, the Jump Command including the address TA is executed and the menu information is read-out and stored in the menu memory. The use of command codes which are directly executed after retrieval allows to invoke a pause function after loading the menu information and displaying a menu or picture. In using the directly executed command codes it is also possible to start with the read out of one of the information tracks without displaying menus. The length of the prepause track 92 corresponds with a playing time of about 2–3 seconds, this means that about 200 menu text lines can be stored in the prepause track 93. However if more menu text lines are to be read in, further menu information can be recorded in te R-W subcode channel in parallel to any part of the main information program. In that case it is preferred to mute the output of audio and video information during the retrieval R-W information via a mute command recorded in the prepause track 93 for muting the output audio information and video information during the read of track 92. Besides a simple and powerful interactive control for CD-player and CDV players the formats of the R to W signal described allows a fast display of additional textual information about the audio or video information recorded in the information carrier itself.

The use of different information categories allows to record textual information of different languages in packets with different main category codes, so that each user can select the language with which he is familiar almost. The use of the different subcategories allows a simple selection of the type of information to be displayed. Since the packets of different categories are interleaved, and the data transfer rate for the information recorded in the R to W signal is high (75 packets per second) the selected type of information in the desired language will be available fast. This high data rate has the advantage that the information of the packets can be repeated several times without loosing perceptible reducing of the access time to the information.

The arrangement shown in FIG. 7 may be extended by a two line LCD display 79a which can be controlled by the processor 77 via a control circuit 78a of an usual type in order to display the text lines with a text position code LCD1, LDC0=01 or 10 indicating the first or second line of the two line display. As said before the text position code LCD0,LCD1=00 is used to indicate that the text line is not to be displayed on the two line display. The text position code LCD1, LCD1=11 force a scroll-up of the information displayed on the two line display 79a, before the new text line is displayed on the lower line.

The arrangement shown in FIG. 7 may be further extended by a second menu memory 82a of a read-only type, in which menu text lines and corresponding commands are permanently stored in order to enable the hardware dependent control of the arrangement, such as e.g. setting of the output level of the audio signal, the setting of the video displaying system or controlling of additional devices such as tuner, video recorder etc. In order to enable a switching from the menu memory 82 to the menu memory 82a and visa versa in each of the menu memories a selectable command code is stored for changing the menu memory used or a control key provided. The use of the two menu memories in which the menu information is stored in the same format has the advantage that the controlling of the hardware dependent function of the arrangement and the controlling of the interactive retrieval of the information recorded on the information carrier can be done by the user in the same way, which means that a very user friendly user interface is obtained.

Figure 9:
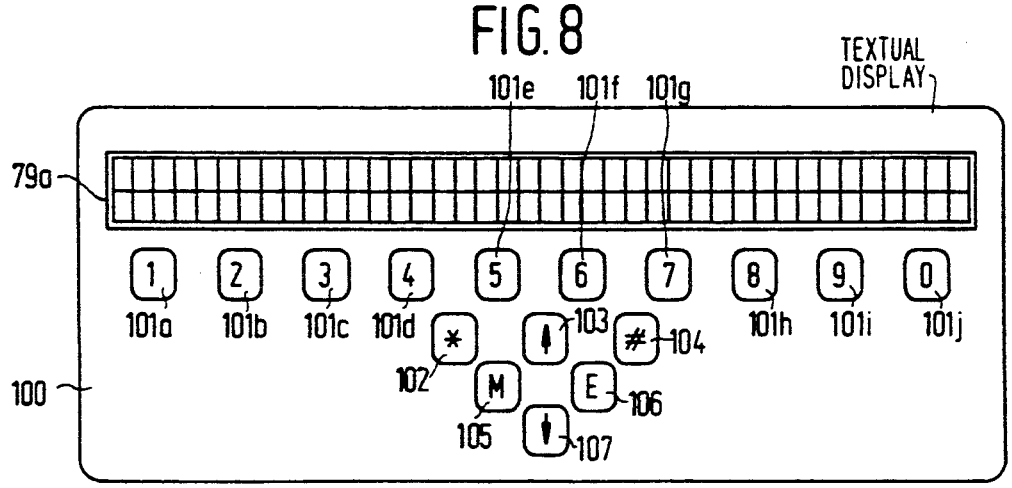
FIG. 9 shows a remote controller for use with the player.

FIG. 9 shows an embodiment of a remote controller 100 for use in the arrangement shown in FIG. 7, in which remote controller the two line display 79a and the selection means 83a are included. The keys of the selection means are indicated by the reference signs 101a, ..., 101j and 102–107. Key 105 is a key for invoking the display of a menu when the display has been set in the display switch OFF mode. When already a menu is displayed, actuating of the key 105 cause that the previous menu is displayed. The keys 103 and 104 are used for cursor control in order to move a cursor displayed on the display 79a or 79 to move upwards or downwards. The arrangement is provided with means of usual type for forcing a scroll-up or a scroll-down of the information displayed, if the cursor has reached the upper or lower text line displayed. The key 106 is used as "ENTER"-key for terminating an instruction inserted via the other keys. The keys 101 may be used for selecting menu items from text lines, which are e.g. indicated by a number in the displayed menu or physically combined with the keys 101.

When the keys 101 are used for this selection function it may be preferably to display on the display 79 the complete menu and on the two line display an indication of the function of key 101 directly above each key, irrespective the cursor position. It may be also advantageous to load the computer 77 with a program for directly inputting the index address of a command code via the remote controller 100. The input of the address can be done by actuating key 104 in order to indicate that an numerical address together with corresponding numerical main and sub category codes is to be inserted for directly addressing a command code. The numerical information is entered by means of the keys 101a–101h. After the direct input of the numerical information the command represented by that information is executed.

In doing so it may be a problem that the user normally does not know the index addresses of the command codes. In order to overcome this problem the microcomputer may be provided with a program for displayaing the address of a selected menu line or item and thus the address of the corresponding command code. By means of a pressing of key 104 during at least a predetermined time interval, e.g. longer than two seconds, it can be indicated by the user that a display of the address of the selected menu text line is wanted.

In the above embodiment the subinformation data packets are recorded together with a digital audio signal on a CD or CDV disc. However in a similar way subinformation data packets can be recorded on other types of record carriers such as e.g. digital audio or video magnetic tape.

Further it is remarked that in the above embodiment only coded text and command codes are comprised by the subinformation packets. However it may be possible to record other information in the packets, such as e.g. compressed picture information, object codes, synthetic speech, etc.

Figure 10:
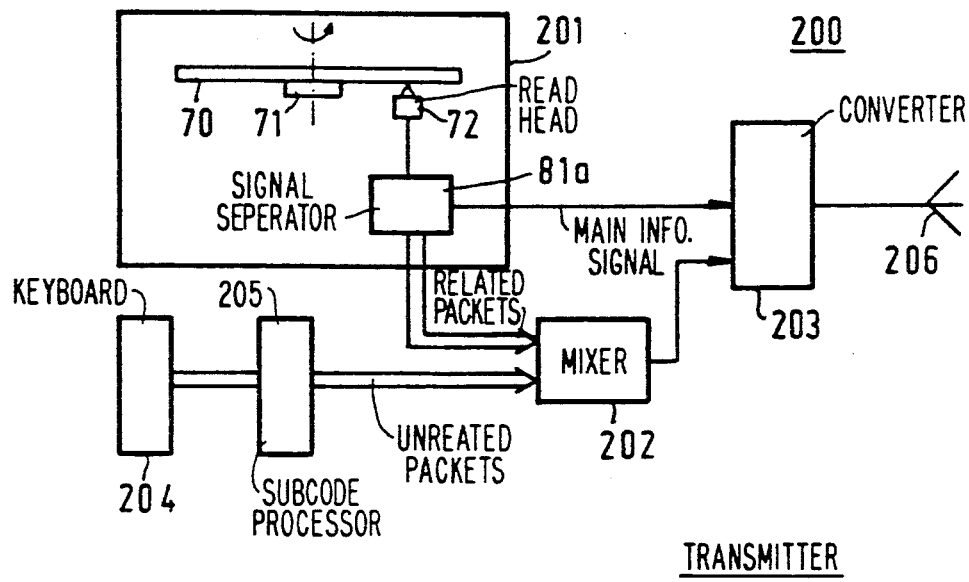
FIG. 10 shows an illustrative embodiment of the transmitting device in accordance to the invention.

FIG. 10 shows an embodiment of a transmitting device 200 in accordance with the invention. The transmitting device 200 comprises a read apparatus 201 for reading the record carrier 70, on which main information signal in the form of digital audio signal together with the packets 30, representing the subinformation related to the main information has been recorded, as described before. The signal read from the record carrier by means of the reading head 72 is supplied to a circuit 81a for separating the main information signal and the R-W subcode channel bits, which form the packets 30 with the subinformation. Packets read from the record carrier will be referred to as related packets. The related packets separated by the circuit 81a are supplied to a mixer circuit 202. The digital audio signal separated by circuit 81a is supplied to a converting circuit 203. The transmitting device 200 is further provided with input means, e.g. a key board 204, for inputting subinformation not related to the main information read from the record carrier. This subinformation may consist of e.g. information about broadcast program, news, weather, traffic conditions, etc.

The keyboard 204 supplies the subinformation to a subinformation processing circuit, e.g. a computer 205 of usual type which is loaded with a program for converting the subinformation received into second packets with the same format as the related packets 30. The packets produced by the computer 205 relates to packets with subinformation which is not correlated with main information signal. These packets will be referred to as unrelated packets. The mixing circuit 202 is of usual type for interleaving the packets received on its two inputs in order to produce a subinformation signal which is supplied to the circuit 203. The converting circuit 203 converts the main signal received from the circuit 81a and the subinformation signal received from mixer circuit 202 into a transmission signal which is transmitted via an antenna 206.

Figure 11:
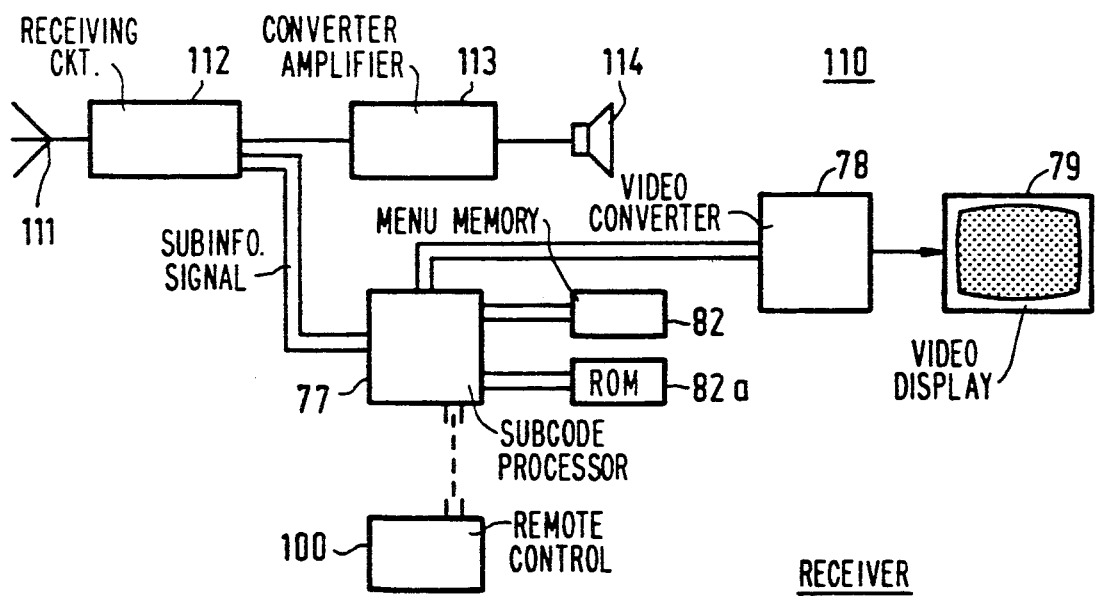
Figure 14A:
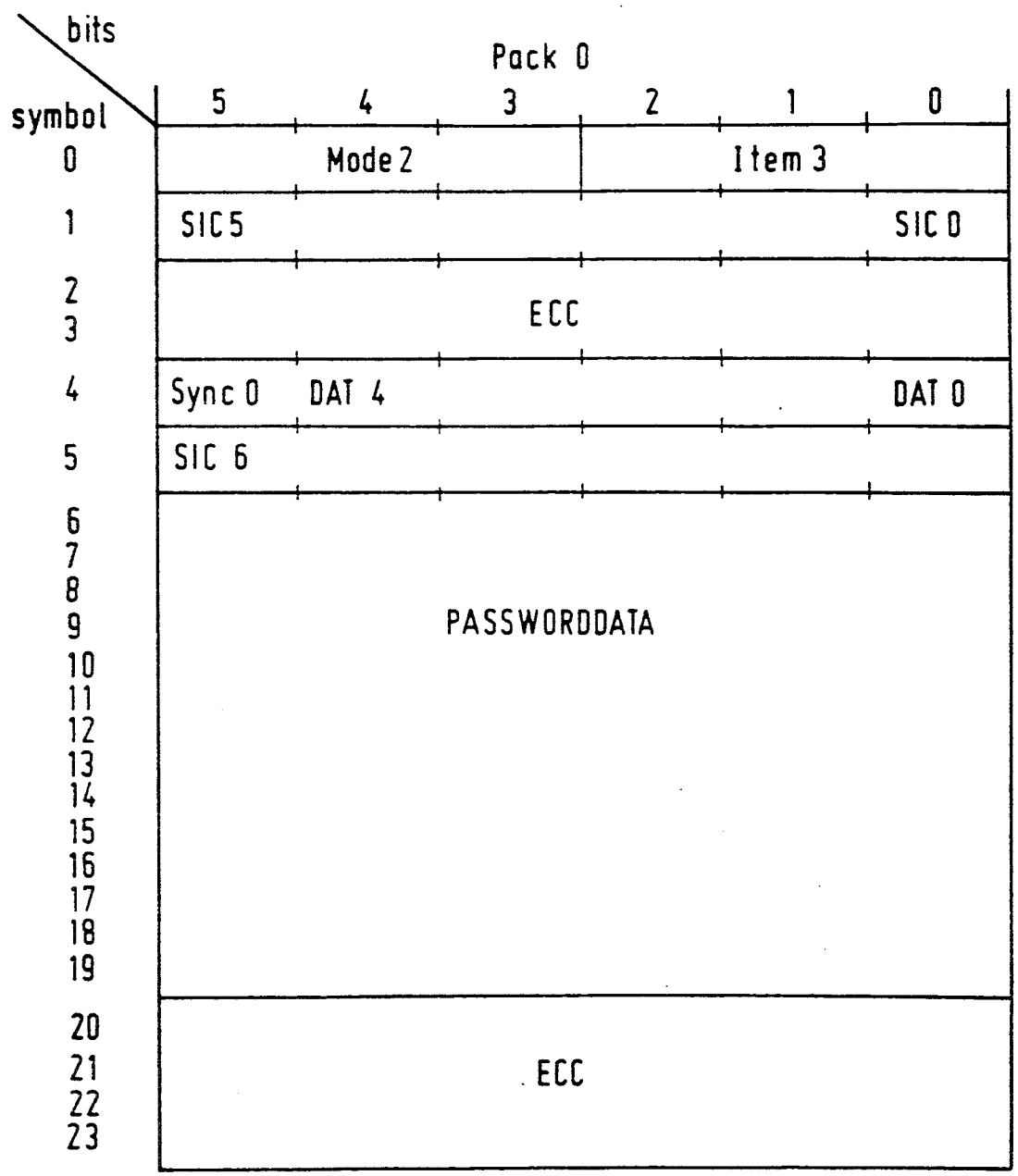
FIGS. 14a-14d shows an embodiment of the data format of a password packet for use in the method according to the invention.
Figure 14B:
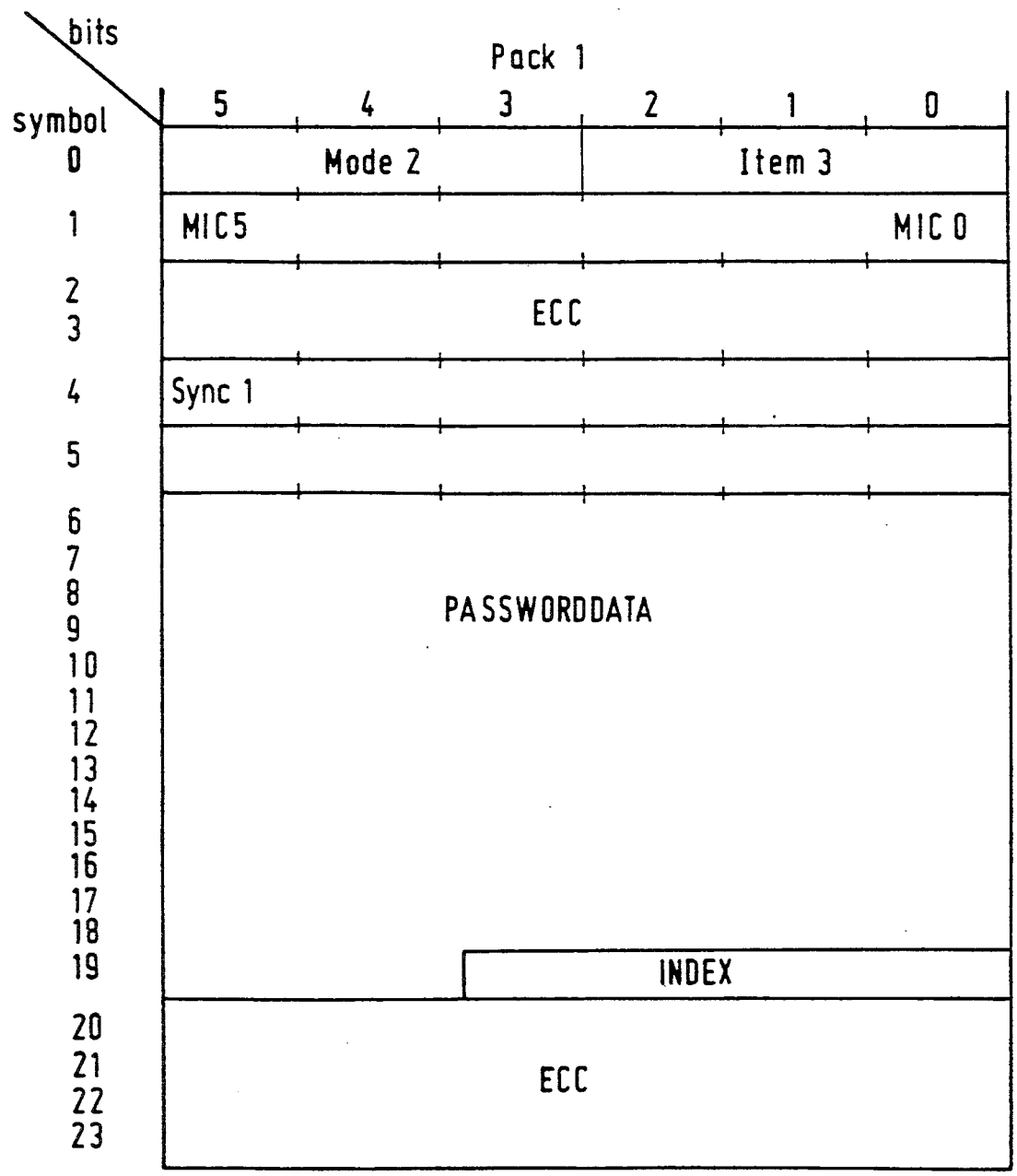
Figure 14C:
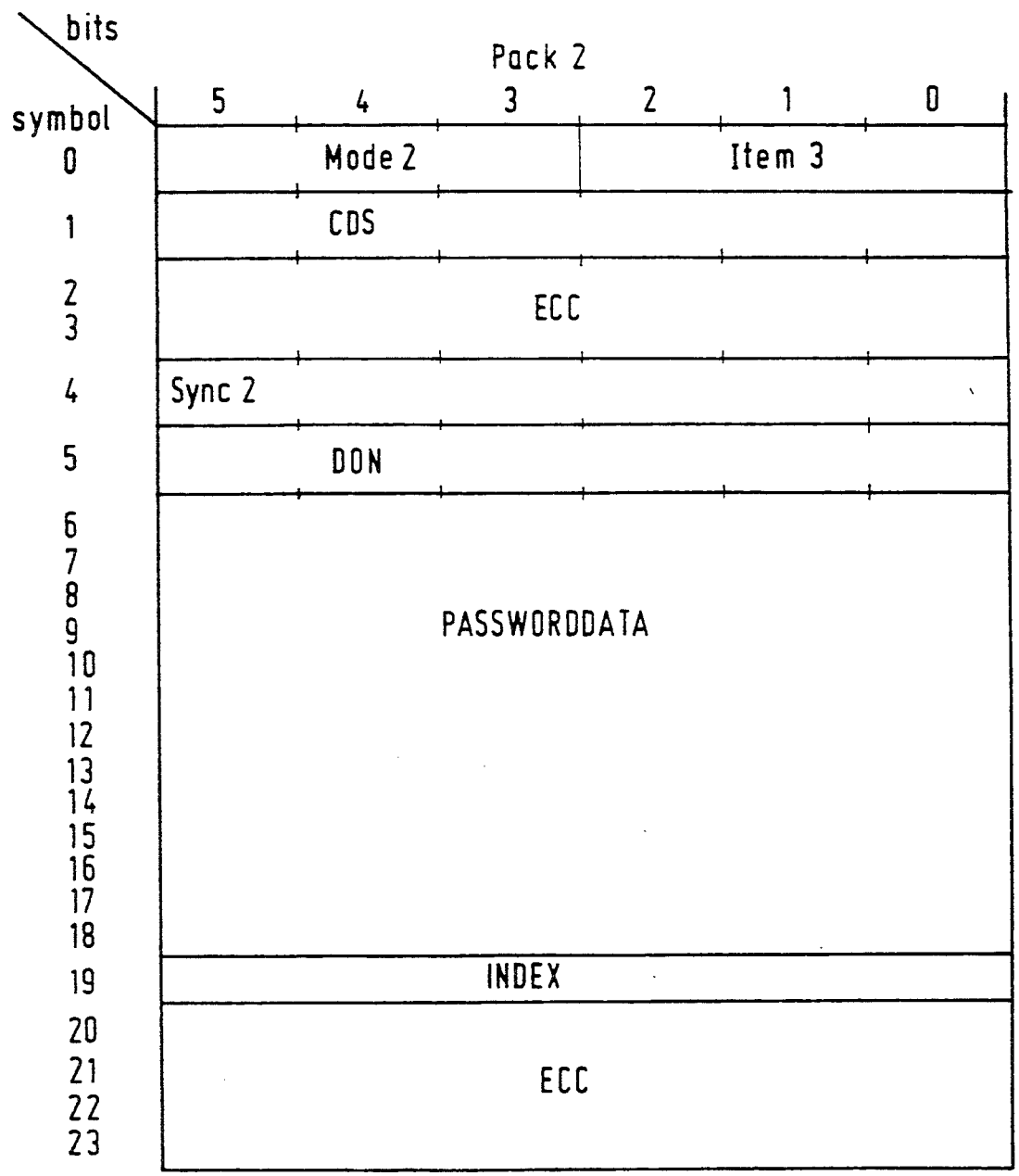
Figure 14D:
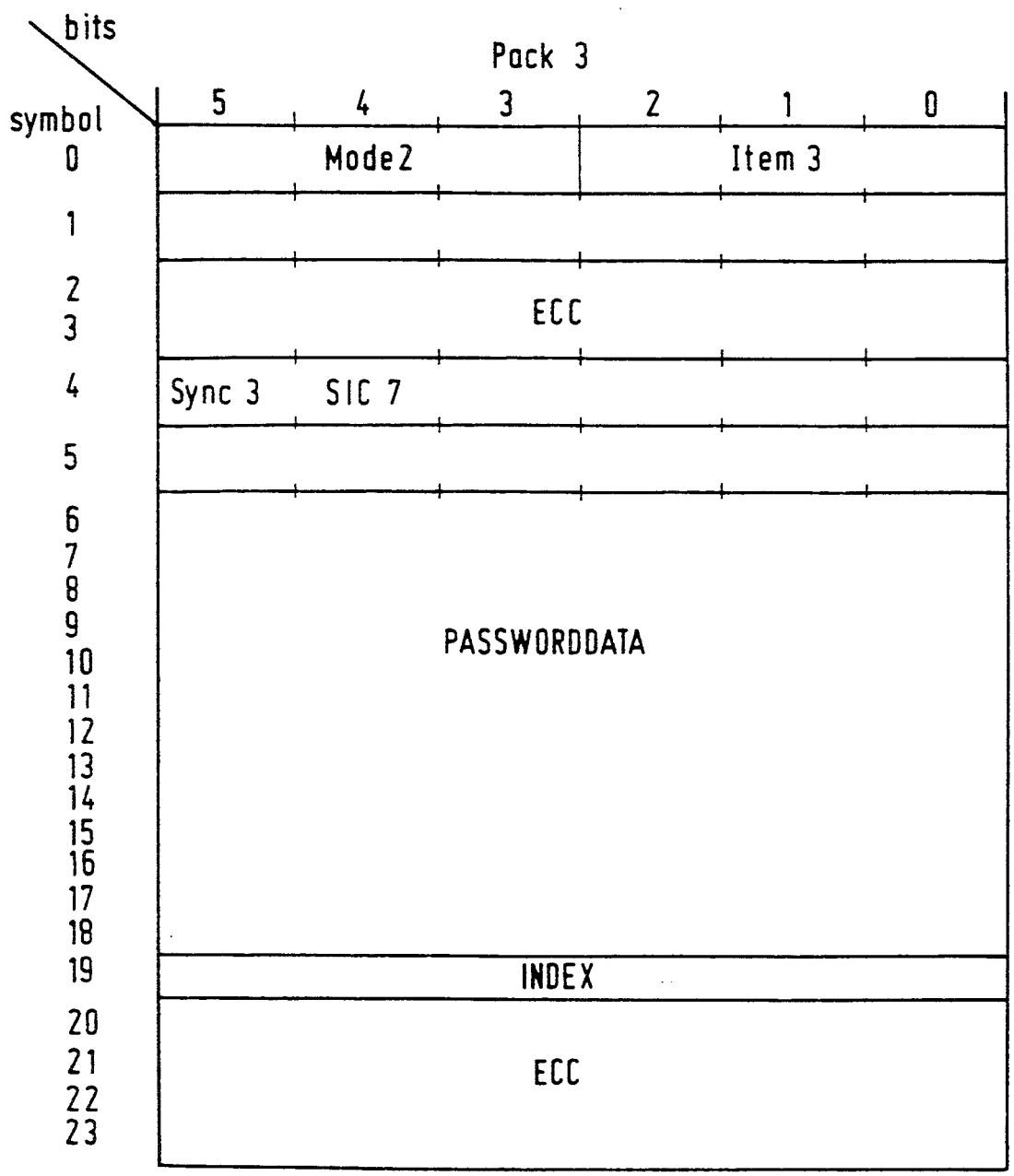

FIG. 11 shows a receiving device 110 in accordance with the invention. The elements in FIG. 11 which are the same as those described with reference to FIGS. 7 and 9 are indicated with the same reference numbers. The receiving device 110 comprises an antenna 111 for receiving the transmission signal transmitted by the transmitting device 200. The transmission signal received is supplied to a receiving circuit 112 of a usual type for reconverting the transmission signal into the main information signal and the subinformation signal. The main information signal may be supplied to a converter/amplifier circuit 113 for converting the main information signal into an input signal for a speaker 114 for reproducing the audio information represented by the main information signal. The packets 30 of the subinformation signal are supplied to the microcomputer 77, which is loaded with the program, as already described in conjunction with FIG. 9, for processing the packets received.

The related packets and unrelated packets both comprise menu information. In order to prevent that the menu information transferred via the related packets and already stored in the memory 82 of the receiving device 110 will be overwritten by menu information transferred via the unrelated packets, a predetermined address range AR1 is reserved for the storage of menu information transferred by the related packets and an other predetermined address range AR2 is reserved for the storage of menu information transferred in the unrelated packets. FIG. 12 shows schematically the different address ranges AR1 and AR2 in the memory 82. The start address of the main menu in the address range AR2 is indicated by a pointer stored at the first address 1 in the memory 82. This pointer is also transferred via the unrelated packets. The first address of the main menu is always the same, e.g. address 2. This allows a jumps from the menu stored in the address ranges AR1 or AR2 to the main menu in the other address range. After the receiving device has been switched on, the main menu in the address range AR2 is selected by e.g. actuating the key 105 of the remote controller 100. The computer 77 reads the actual main menu start address indicated by the pointer in address 1. A jump to the main menu indicated by the pointer in address 1 is executed after actuating the key 105. A jump from a menu in the address range AR2 to the main menu address in the address range AR1 can also be simply realized when the main menu in the address range AR2 comprises a jump command to the start address of the main menu in the address range AR1.

The combination of the transmitting device 200 and the receiving device 110 has the advantage that in a very simple way the subinformation related to the menu information already recorded on the record carrier can be transferred together with the unrelated subinformation without reformatting the related packets read from the record carrier.

FIG. 13 shows a modified receiving device 110a which comprises a reading device 130 for reading the record carrier 70. In the signal path between the receiving circuit 112 and the processor 77 a two-input selector circuit 131 has been placed. The packets delivered by the receiving circuit 112 are supplied to one of the inputs of the selector circuit 131 and the packets read out with the reading apparatus 130 are supplied to the other input of the selector circuit 131. The selector circuit 131 is controlled by a control signal which is generated by the control circuit 132 of the reading apparatus 130 when it is switched on. In response to this control signal the selector circuit 131 is controlled such that the packets supplied by the reading read device 130 are supplied to the computer 77. When the apparatus 130 is switched off no control signal is generated, resulting in that the selector circuit 131 supplies the packets received from the receiving circuit 112 to the computer 77. The control signal produced by control circuit 132 is also supplied to the processor 77, which is loaded with a program which causes the menu with its start address at address 1 being displayed when the main menu is selected via the remote controller 100 by means of key 105. The receiving device shown in FIG. 13, has the advantage that the same processing circuit 77 can be used for both the processing of the packets received from the reading device 130 and alternatively the packets received from receiving circuit 112.

By means of the transmitting device 200 it is also possible to transmit individual coded messages to which a password code has been assigned. This message and password can be inserted by means of e.g. the keyboard 204 (see FIG. 10). The processor 205 formats the password code and the coded messages into packets. Preferably one packet is used for the password code which is indicated by an item 3 code in the bits 2-0 of the symbol 0 of the packs 0-3 of the password packet. In FIG. 14 the format of an embodiment of a password packet is shown. The format of the packet shown in FIG. 14 is substantially the same as that shown in FIG. 6. In this password packet 320 bits (40 bytes) are available for transmitting the password information. Of these 40 bytes a predetermined number of bytes, e.g. 34 bytes, may be used for defining a 34-character password. The other 6 bytes can be used for controlling the message transfer. E.g. 4 bytes of these 6 bytes can be used for defining a begin and end address in the memory 82. Preferably this begin and end address are within an address range AR3 (see FIG. 12) which is outside the adress ranges AR1 and AR2 for storing the menus, so that the message and the menus are not overwritten by one another. The remaining 2 bytes can be used for indicating the number of bytes of the message to follow. A number of bits of said two bytes, e.g. the two significant bits may be used for a transferring an overwrite protection code, which indicates whether the message may be overwritten by an external source after it has been loaded in the memory 82. The bytes of the coded messages are transferred by packets following the password packet. These packets may be formatted in the same way as the packets for transmitting coded text lines which are shown in FIG. 5.

For the receiving of the messages the processor 77 in the receiving device is loaded with a program for detecting the presence of a password packet by means of the detection of the presence of the item-3 code in the packets received. After the detection of password packet, the character password code contained by the packet is compared with a receiver defined password. This receiver defined password code may be stored in the memory on an address range of which the beginning is indicated by the index codes represented by bits 0-3 of the symbol 19 of packet 1 and the complete symbols 19 of pack 2 and 3. However, it is also possible to store the user defined password code in a predetermined part of the menu memory 82. If the received password code corresponds with the user defined password code the coded message transferred by packets following the password packets are stored in the memory 82 at the address indicated in the password packet. The whole contents or a selected part of a menage stored in the address range AR2 may be displayed on the displaying device in response to an read-out instruction put-in by the user via the remote controller 100.

FIG. 15 shows another illustrative embodiment of a receiver device in accordance to the invention, which comprises a answering device 150 for outputting a coded answer in response to a received password code that corresponds to the receiver defined password code. The answering device 150 is coupled with the processor 77. The control of the device 150 may be realized as follows: together with the user defined password code an answer command code may be stored in the memory of processor 77. This command code comprises several bytes for indicating the peripheral device address code indicating the peripheral device via which the answer is to be output, bytes for indicating the begin address at which the coded answer to be output is stored in the memory 82 and the number of packets comprising of the message. After the detection of the presence of a correct password code the computer supplies the message, indicated to the defined peripheral device. The password code, the answer command code and the coded answer can be loaded by the user in the memory 82 using an input device, e.g. an alphanumerical keyboard. These information can also be put in by means of the remote controller 100 e.g. by displaying the alphanumerical characters on the display 79a and selecting characters by means of a cursor. In that case the keys 103 and 107 of the remote controller can be used for cursor control and the key 106 can be used for entering a character indicated by the cursor. The several programs for controlling the display of messages received and for loading the cursor codes, answer command codes, used the coded answer into the memory 82 may be selected and started by means of menus loaded in the memory 82 or 82a.

Although various illustrative embodiments of the present invention have been described in detail, it will be apparent to those skilled in the art that various modifications and adaptations thereof can be made without departing from the teachings and scope of the invention as set forth in the ensuing claims.

I claim:

1. A method of producing a transmission signal which includes a main information signal and a subinformation signal, comprising the steps of:
   reading the main information signal and a series of first subinformation data packets from a record carrier on which such signal and data packets have been recorded together, such data packets representing textual information related to the main information signal;
   interleaving the series of first subinformation data packets with a series of second subinformation data packets which represent textual subinformation unrelated to the main information signal, the first and second subinformation data packets having the same predetermined data format, the interleaved data packets constituting said subinformation signal; and
   combining the main information signal and the subinformation signal to form said transmission signal.

2. A method as claimed in claim 1, wherein the first and second subinformation data packets respectively represent information in a first and second series of menus, said menus comprising items representing commands for reproducing such information and corresponding command codes for executing the commands.

3. A method as claimed in claim 2, wherein menu items include address information indicating addresses at which such items are to be stored in a memory of a receiver adapted for reception of the transmission signal.

4. A method as claimed in claim 3, wherein a main menu of the first menus includes address information indicating a predetermined address in said receiver memory at which said first main menu is to be stored, and a main menu of the second menus includes a combination of a second menu item and a command code referring to the first main menu by its predetermined memory address.

5. A method as claimed in claim 4, wherein the subinformation data packets comprise a pointer indicating the start address in said receiver memory of the second main menu, said pointer further indicating predetermined addresses in said receiver memory at which said pointer is to be stored.

6. A method as claimed in any of claims 1-5, wherein the second subinformation data packets comprise password code messages.

7. A method as claimed in claim 6, wherein the password code messages include address information indicating addresses in said receiver memory at which the code messages are to be stored.

8. Apparatus for producing a transmission signal which includes a main information signal and a subinformation signal, comprising:
   read means for reading the main information signal and a series of first subinformation data packets from a record carrier on which such signal and first subinformation data packets have been recorded together, such data packets having a predetermined format and representing information related to the main information signal;
   means for producing a series of second subinformation data packets which are unrelated to the main information signal and have the same format as the first subinformation data packets;
   converting means for interleaving the first and second series of subinformation data packets, the resulting series of interleaved data packets constituting said subinformation signal; and
   means for combining the main information signal and said subinformation signal to form said transmission signal.

9. Transmission apparatus as claimed in claim 8, wherein the second subinformation data packets comprise password codes and coded messages corresponding to the password codes.

10. Transmission apparatus as claimed in claim 8, wherein the first and second subinformation data packets represent information in first and second menus respectively, the menu items including address information indicating addresses at which such items are to be stored in a memory of a receiver which is adapted for reception of the transmission signal; and said converting means is adapted to add address codes to the transmission signal indicating addresses in a predetermined address range of said receiver memory outside the address range in which menu items are to be stored.

11. A receiver for a transmission signal which includes a main information signal and a subinformation signal which consists of a series of interleaved first and second subinformation data packets, the main information signal and the first series of data packets having originated from a record carrier on which they were recorded together, the first subinformation data packets representing textual information in a plurality of first menus relating to the main information signal and the second subinformation data packets representing textual information in a plurality of second menus unrelated to the main information signal, the menu items being in the form of commands and corresponding command codes for executing such commands; said receiver comprising:
   means for separating the main information signal and the subinformation signal;
   means for reproducing the information represented by the main information signal;
   a memory for storing menu items of said first and second menus in a selected part of said memory;
   display means responsive to the commands in the menus stored in said selected part of said memory for displaying selected ones of such menus corresponding to parts of the information represented by the subinformation signal; and
   selection means for selecting a menu item of a displayed menu and executing the command indicated by the command code stored in said memory corresponding to said selected menu item.

12. A receiver as claimed in claim 11, wherein a main menu of the first menus identifies a predetermined address in said memory at which said first main menu is stored, a main menu of the second menus includes a combination of a second menu item and a command code referring to the first main menu by its predetermined address, and the second subinformation data packets comprise password code messages comprising password codes; said selection means being adapted to select coded messages indicated by a password code by comparing the received password code with a specific user password code; said receiver further comprising input means by which a user can enter a specific user password code in said selection means.

13. A receiver as claimed in claim 12, further comprising means for storing the coded messages in said memory at addresses identified by such messages.

14. A receiver as claimed in either of claims 12 or 13, further comprising answering means for transmitting a reply to a received password code and means for actuating said answering means in response to reception of a password code corresponding to the specific user password code which has been entered in said selection means.

* * * * *